(12) United States Patent
Jo

(10) Patent No.: US 10,770,070 B2
(45) Date of Patent: Sep. 8, 2020

(54) VOICE RECOGNITION APPARATUS, VEHICLE INCLUDING THE SAME, AND CONTROL METHOD THEREOF

(71) Applicants: HYUNDAI MOTOR COMPANY, Seoul (KR); KIA MOTORS CORPORATION, Seoul (KR)

(72) Inventor: Sung Dong Jo, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 129 days.

(21) Appl. No.: 16/133,855

(22) Filed: Sep. 18, 2018

(65) Prior Publication Data

US 2019/0379777 A1 Dec. 12, 2019

(30) Foreign Application Priority Data

Jun. 7, 2018 (KR) ........................ 10-2018-0065203

(51) Int. Cl.
| | |
|---|---|
| *G10L 15/00* | (2013.01) |
| *G10L 15/22* | (2006.01) |
| *H04M 1/27* | (2006.01) |
| *B60R 11/02* | (2006.01) |
| *G06F 3/16* | (2006.01) |
| *H04M 1/2745* | (2020.01) |

(52) U.S. Cl.
CPC .......... *G10L 15/22* (2013.01); *B60R 11/0241* (2013.01); *G06F 3/167* (2013.01); *H04M 1/271* (2013.01); *G10L 2015/223* (2013.01); *G10L 2015/228* (2013.01); *H04M 1/27463* (2020.01)

(58) Field of Classification Search
CPC .......... G10L 15/00; G10L 15/01; G10L 15/02; G10L 15/08; G10L 15/20; G10L 15/2628; G10L 15/30
USPC ....... 704/251, 231, 243, 244, 250, 255, 258, 704/270
See application file for complete search history.

(56) References Cited

U.S. PATENT DOCUMENTS

| | | | |
|---|---|---|---|
| 6,449,496 B1 | 9/2002 | Beith et al. | |
| 2005/0113113 A1* | 5/2005 | Reed | H04L 51/38 455/456.3 |
| 2010/0220250 A1* | 9/2010 | Vanderwall | G01C 21/3688 348/837 |

(Continued)

FOREIGN PATENT DOCUMENTS

| | | |
|---|---|---|
| JP | 2002-341892 A | 11/2002 |
| JP | 4981579 B2 | 7/2012 |
| KR | 10-2001-0082390 A | 8/2001 |

(Continued)

*Primary Examiner* — Qi Han
(74) *Attorney, Agent, or Firm* — Morgan, Lewis & Bockius LLP

(57) ABSTRACT

A voice recognition apparatus includes: a first controller configured to acquire a voice signal of a user and acquire a phonebook list including at least one phonebook data piece in which a name and a phone number are matched from a user terminal; and a voice recognition engine to recognize the voice signal based on a voice recognition parameter, wherein the first controller is further configured to determine whether to change the voice recognition parameter value based on the phonebook list and change the voice recognition parameter value based on a determination result.

17 Claims, 9 Drawing Sheets

(56) References Cited

U.S. PATENT DOCUMENTS

2015/0199965 A1* 7/2015 Leak ..................... G10L 15/22
  704/249
2016/0269524 A1* 9/2016 Stottlemyer ......... H04B 1/3822

FOREIGN PATENT DOCUMENTS

| KR | 10-1021216 B1 | 3/2011 |
| KR | 10-2016-0089184 A | 7/2016 |
| KR | 10-1664080 B1 | 10/2016 |
| KR | 10-1675312 B1 | 11/2016 |
| WO | 2004/023455 A2 | 3/2004 |

* cited by examiner

FIG. 5A

|  | NUMBER OF PHONEBOOK DATA PIECES | RECOGNITION RATE | REACTION TIME | ACCURACY PARAMETER |
|---|---|---|---|---|
| REFERENCE | 1000 | 95% | 3.0 SECONDS | 1500 |
| BEFORE CHANGE | 5000 | 80% | 3.0 SECONDS | 1500 |
| AFTER CHANGE | 5000 | 95% | 4.0 SECONDS | 2500 |

FIG. 5B

|  | NUMBER OF PHONEBOOK DATA PIECES | RECOGNITION RATE | REACTION TIME | ACCURACY PARAMETER |
|---|---|---|---|---|
| REFERENCE | 1000 | 95% | 3.0 SECONDS | 1500 |
| BEFORE CHANGE | 100 | 95% | 2.0 SECONDS | 1500 |
| AFTER CHANGE | 100 | 94% | 1.0 SECONDS | 500 |

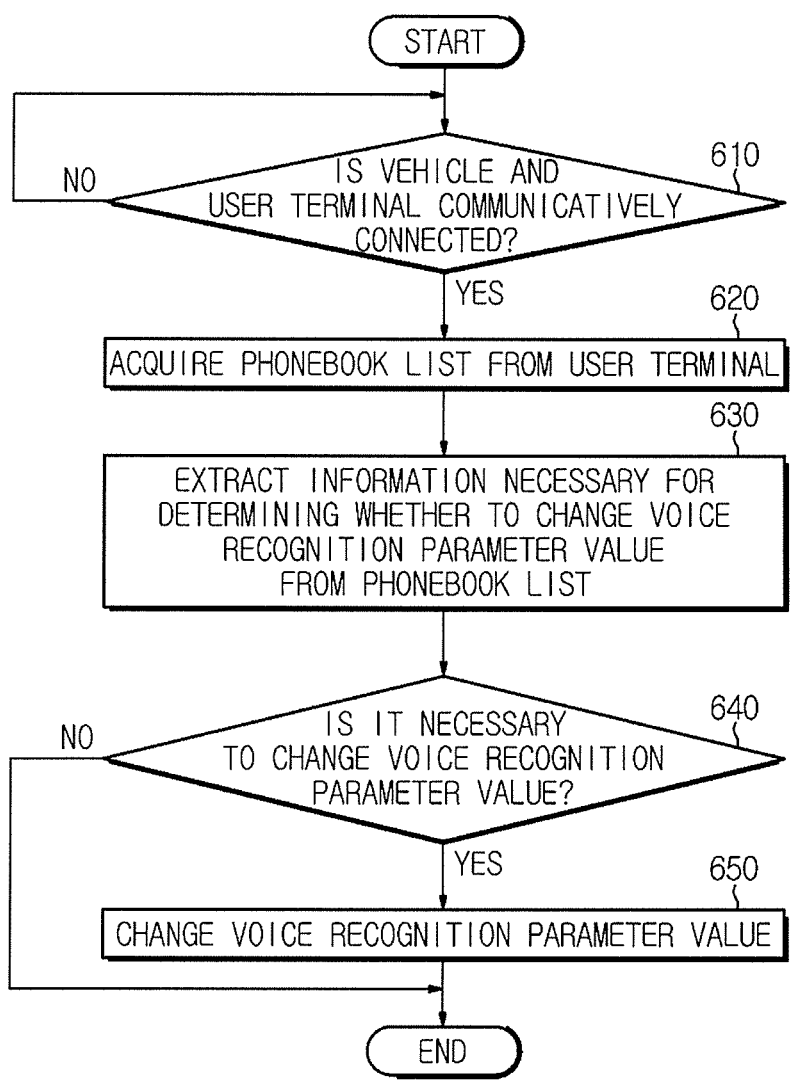

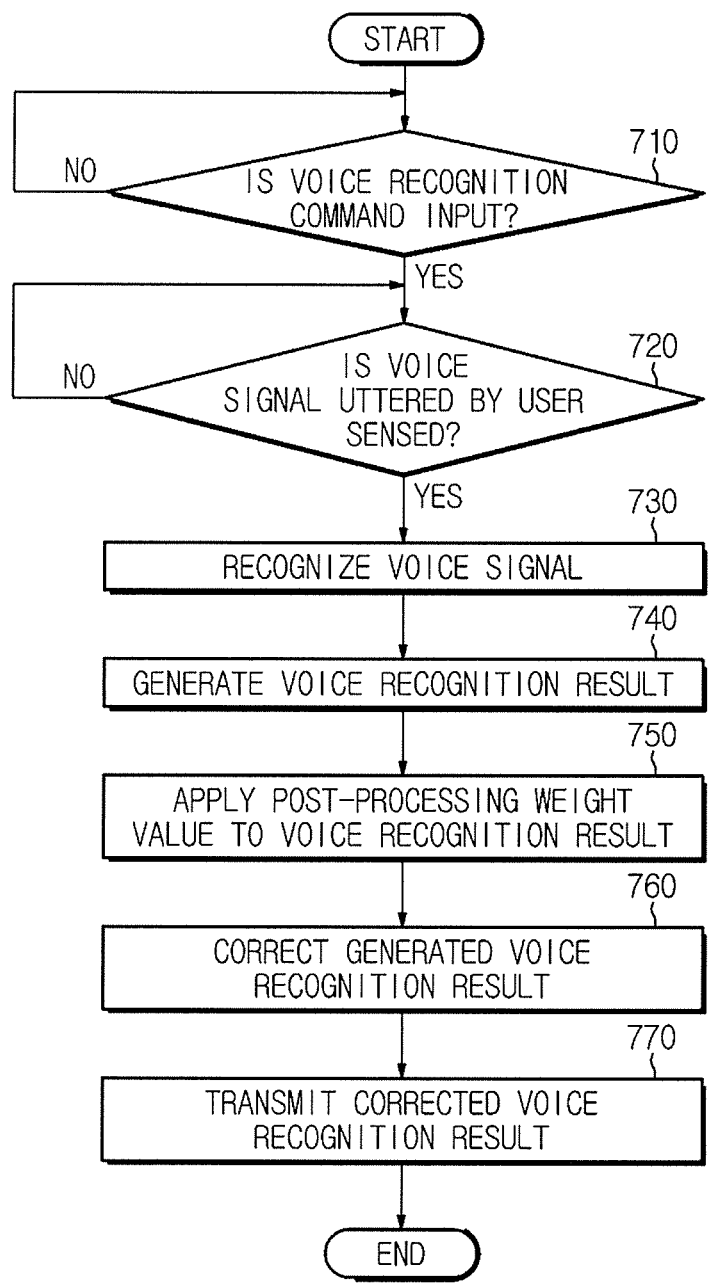

VOICE RECOGNITION APPARATUS, VEHICLE INCLUDING THE SAME, AND CONTROL METHOD THEREOF

CROSS-REFERENCE TO RELATED APPLICATION(S)

This application is based on and claims priority under 35 U.S.C. § 119 to Korean Patent Application No. 10-2018-0065203, filed on Jun. 7, 2018 in the Korean Intellectual Property Office, the disclosure of which is incorporated by reference herein in its entirety.

TECHNICAL FIELD

The present disclosure relates to a voice recognition apparatus that recognizes a user's voice and performs a specific function according to the recognized voice, a vehicle including the same, and a control method thereof.

BACKGROUND

As technologies for vehicles are being developed, various functions for user convenience are available in addition to driving, which is a basic vehicle function.

Particularly, when a voice recognition technology for recognizing the voice of a user and performing a function corresponding to the voice is applied to the vehicle, the operation load of the user may be effectively reduced.

The vehicle to which the voice recognition technology is applied may perform various functions of an external terminal within the vehicle, such as a function of performing a telephone call of a user terminal within the vehicle through communication with the user terminal.

SUMMARY

It is an aspect of the present disclosure to provide a voice recognition apparatus capable of providing a user with an optimized voice recognition function utilizing information of a user terminal, a vehicle including the same, and a control method thereof.

Additional aspects of the present disclosure will be set forth in part in the description which follows and, in part, will be obvious from the description, or may be learned by practice of the disclosure.

In accordance with one aspect of the present disclosure, a voice recognition apparatus comprises a first controller configured to: acquire a voice signal of a user and acquire a phonebook list including at least one phonebook data piece in which a name and a phone number are matched from a user terminal; recognize the voice signal based on a voice recognition parameter; and determine whether to change a value of the voice recognition parameter based on the phonebook list, and to change the value of the voice recognition parameter based on the determination result.

The first controller further may acquire call history information from the user terminal.

The first controller may extract at least one information of the number of total phonebook data pieces, the number of phonebook data pieces in which names are one word, and the number of phonebook data pieces in which names have similar pronunciations from the phonebook list, and determine whether to change the value of the voice recognition parameter based on the extracted at least one information.

The voice recognition parameter is an accuracy parameter, and the first controller may determine the voice recognition difficulty based on the extracted information and determine whether to change a value of the accuracy parameter based on the determined voice recognition difficulty.

The first controller may increase the value of the accuracy parameter when it is determined that the voice recognition difficulty is high.

The first controller may decrease the value of the accuracy parameter when it is determined that the voice recognition difficulty is low.

The first controller may determine that the voice recognition difficulty is high when at least one of the case where the number of total phonebook data pieces is larger than a predetermined number, the case where the number of phonebook data pieces in which names are one word is larger than a predetermined number, and the case where the number of phonebook data pieces in which names have similar pronunciations is larger than a predetermined number is present.

The voice recognition apparatus may further comprise a post processor to apply a post-processing weight value to a voice recognition result of the first controller based on the call history information and to correct the voice recognition result.

The voice recognition apparatus may further comprise a storage to store pronunciation string data; and a second controller to confirm whether the performance of the operation according to a voice recognition result of the first controller stops, and to update the pronunciation string data based on the confirmation result, wherein the first controller may recognize the voice signal by matching the voice signal and the pronunciation string data.

The second controller may determine a behavior pattern of the user when the performance of the operation according to the voice recognition result stops, and update the pronunciation string data by reflecting the determined behavior pattern.

The second controller may determine whether to update the pronunciation string data based on at least one of the number of utterances of the user, the phonebook list and call history information.

In accordance with another aspect of the present disclosure, a vehicle comprises: a communication device to receive a phonebook list including at least one phonebook data piece in which a name and a phone number are matched from a user terminal; a voice sensor to sense a voice uttered by a user and convert the voice into a voice signal; a voice recognition apparatus to acquire the phone book list of the user terminal received by the communication device, change a value of a voice recognition parameter based on the phonebook list, and recognize the voice signal based on the voice recognition parameter; and a main controller to transmit an operation command according to a voice recognition result of the voice recognition apparatus to the communication device.

The voice recognition apparatus may extract at least one information of the number of total phonebook data pieces, the number of phonebook data pieces in which names are one word, and the number of phonebook data pieces in which names have similar pronunciations from the phonebook list, determines whether to change the value of the voice recognition parameter based on the extracted information, and changes the value of the voice recognition parameter according to the determination result.

The voice recognition parameter may be an accuracy parameter, and the voice recognition apparatus may determine the voice recognition difficulty based on the extracted information and determine whether to change the value of the accuracy parameter based on the determined voice recognition difficulty.

The voice recognition apparatus may increase the value of the accuracy parameter when it is determined that the voice recognition difficulty is high, and decrease the value of the accuracy parameter when it is determined that the voice recognition difficulty is low.

In accordance with another aspect of the present disclosure, a control method of a vehicle comprises: confirming, by a controller, whether a vehicle and a user terminal are communicatively connected; acquiring, by the controller, a phonebook list including at least one phonebook data piece in which a name and a phone number are matched from the user terminal; changing, by the controller, a value of a voice recognition parameter based on the phonebook list; sensing a voice uttered by a user and converting the voice into a voice signal; recognizing, by the controller, the voice signal based on the voice recognition parameter to generate a voice recognition result; transmitting, by the controller, an operation command according to the voice recognition result; acquiring, by the controller, call history information from the user terminal; and applying, by a post processor, a post-processing weight value to a voice recognition result based on the call history information and correcting the voice recognition result.

The step of changing the value of the voice recognition parameter based on the phonebook list may comprise: extracting at least one information of the number of total phonebook data pieces, the number of phonebook data pieces in which names are one word, and the number of phonebook data pieces in which names have similar pronunciations from the phonebook list; and determining whether to change the value of the voice recognition parameter based on the extracted at least one information, and changing the value of the voice recognition parameter according to the determination result.

The voice recognition parameter is an accuracy parameter, the step of changing the value of the voice recognition parameter based on the phonebook list may comprise: determining the voice recognition difficulty based on the extracted information; and changing the value of the accuracy parameter based on the determined voice recognition difficulty, and the step of changing the value of the accuracy parameter based on the determined voice recognition difficulty may increase the value of the accuracy parameter when it is determined that the voice recognition difficulty is high, and decrease the value of the accuracy parameter when it is determined that the voice recognition difficulty is low.

The step of determining the voice recognition difficulty based on the extracted information may determine that the voice recognition difficulty is high when at least one of the case where the number of total phonebook data pieces is larger than a predetermined number, the case where the number of phonebook data pieces in which names are one word is larger than a predetermined number, and the case where the number of phonebook data pieces in which names have similar pronunciations is larger than a predetermined number is present.

The control method of a vehicle may further comprise: generating a voice recognition result by matching pronunciation string data stored in advance and the voice signal; confirming whether the performance of the operation according to the voice recognition result stops; and updating the pronunciation string data based on the confirmation result, wherein the step of updating the pronunciation string data based on the confirmation determines a behavior pattern of the user when the performance of the operation according to the voice recognition result stops, and updates the pronunciation string data by reflecting the behavior pattern.

BRIEF DESCRIPTION OF THE DRAWINGS

FIGS. 5A and 5B are tables for explaining a parameter setting operation of a voice recognition apparatus according to an exemplary embodiment of the present disclosure.

FIG. 6 is a flow chart of a vehicle control method according to an exemplary embodiment of the present disclosure.

FIG. 7 is a flow chart of a vehicle control method according to an exemplary embodiment of the present disclosure.

DETAILED DESCRIPTION

Hereinafter, the working principle and embodiments of the present disclosure will be described with reference to the accompanying drawings.

Figure 1:
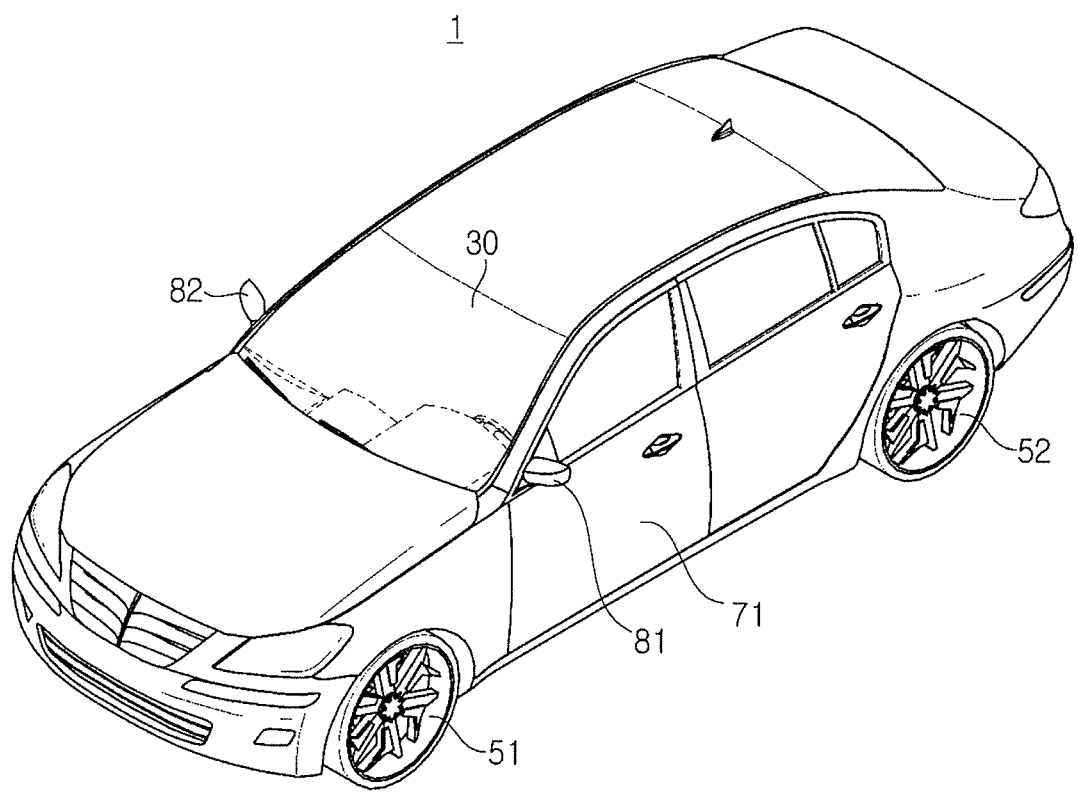
FIG. 1 is a view illustrating an appearance of a vehicle according to an exemplary embodiment of the present disclosure.

Referring to FIG. 1, a vehicle 1 according to an exemplary embodiment of the present disclosure includes traveling wheels 51 and 52 for moving the vehicle 1, doors 71 and 72 for shielding the interior of the vehicle 1 from the outside, a front glass 30 for providing a driver inside the vehicle 1 with a field of view ahead of the vehicle 1, and side mirrors 81 and 82 for providing the driver with a field of view behind the vehicle 1.

The traveling wheels 51 and 52 include the front wheels 51 provided at the front of the vehicle 1 and the rear wheels 52 provided at the rear of the vehicle 1, and a rotational force is provided to the front wheels 51 or the rear wheels 52 in accordance with the driving method of the vehicle 1. A rotational force is provided to the front wheels 51 when the vehicle 1 is a front-wheel drive vehicle, and a rotational force is provided to the rear wheels 52 when the vehicle is a rear-wheel drive vehicle. When the vehicle 1 is a four-wheel drive vehicle, a rotational force is provided to both the front wheels 51 and the rear wheels 52.

The doors 71 and 72 are rotatably provided on the left and right sides of the vehicle 1 to allow the driver to enter the inside of the vehicle 1 when opened and to shield the inside of the vehicle 1 from the outside when closed.

The front glass 30 is provided on a front upper side of the vehicle 1 so that the driver inside the vehicle 1 may obtain visual information ahead of the vehicle 1 and is also referred to as a windshield glass.

The side mirrors 81 and 82 include the left side mirror 81 provided on the left side of the vehicle 1 and the right side mirror 82 provided on the right side, and allow the driver inside the vehicle 1 to obtain visual information on the sides and rear of the vehicle 1.

Figure 2:
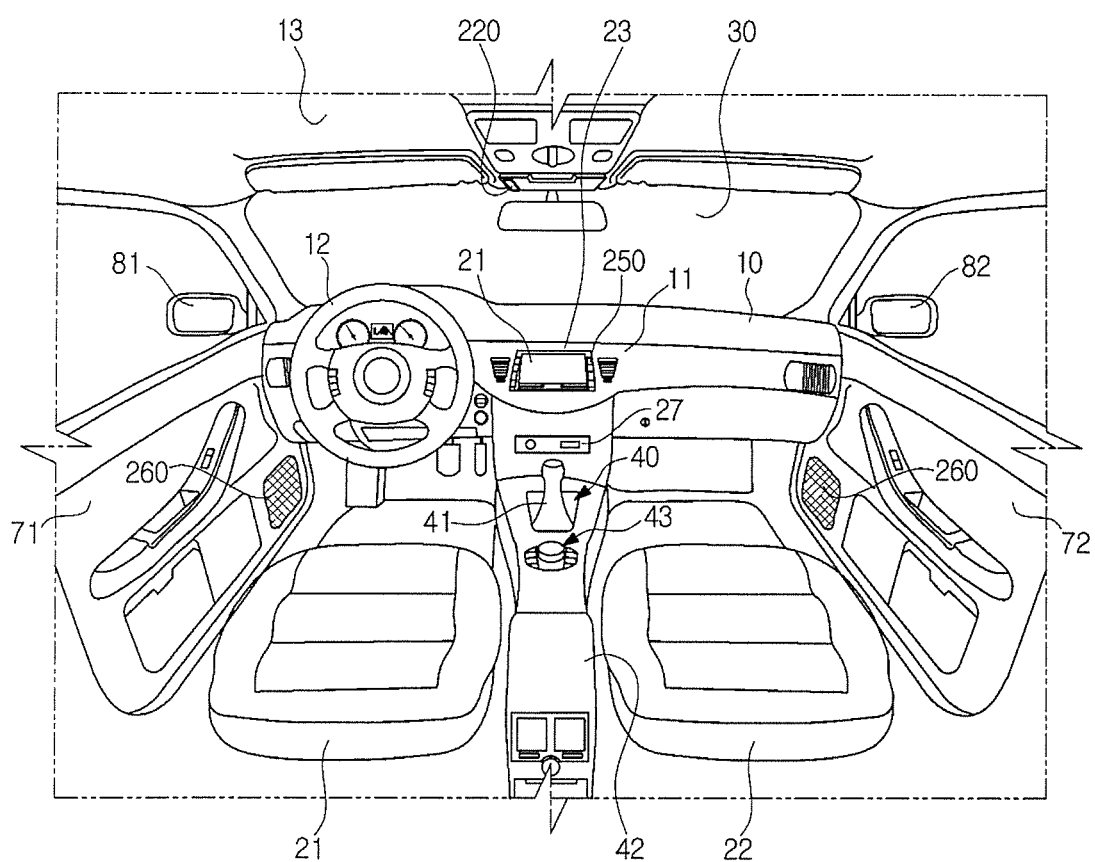
FIG. 2 is a view illustrating an internal configuration of a vehicle according to an exemplary embodiment of the present disclosure.

Referring to FIG. 2, an audio video navigation (AVN) device 23 may be provided at a center fascia 11, which is a central area of a dashboard 10. The AVN device 23 is a device that may integrally perform audio, video, and navigation functions, or perform some of these functions, and a display 21 may selectively display at least one of an audio screen, a video screen, and a navigation screen. In addition, the display 21 may display various control screens related to the control of the vehicle 1, a screen showing information on the state of the vehicle 1, or a screen related to an additional function that may be executed in the AVN device 23.

The display 21 may be implemented as one of various display apparatuses such as a liquid crystal display (LCD), a light emitting diode (LED), a plasma display panel (PDP), an organic light emitting diode (OLED), and a cathode ray tube (CRT).

Figure 3:
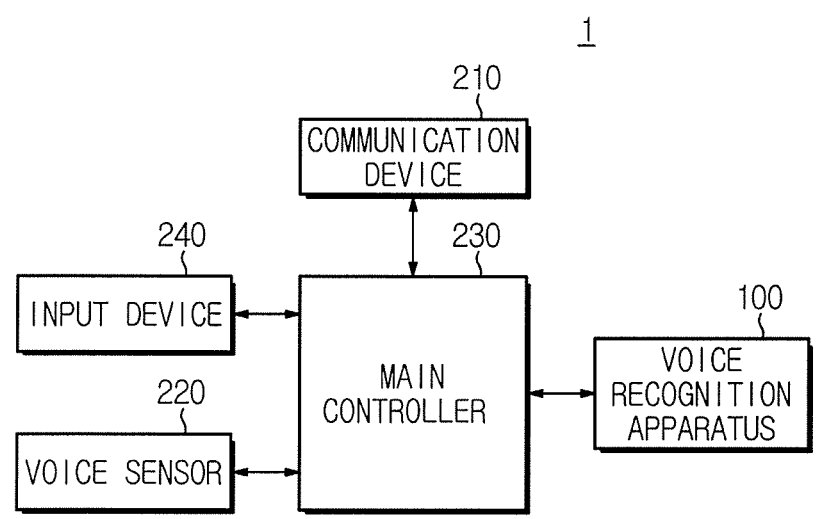
FIG. 3 is a control block diagram of a vehicle according to an exemplary embodiment of the present disclosure.

A user may input a command for controlling the AVN device 23 by operating an input device 240 (see FIG. 3). The input device 240 may be provided in a hard key type in an area adjacent to the display 21 as shown in FIG. 2. In a case where the display 21 is implemented as a touch screen type, the display 21 may also perform the function of the input device 240 as well.

A multi terminal 27 which may be wired to a user terminal may be provided on the center fascia 11. That is, the multi terminal 27 enables wired communication between the vehicle 1 and the user terminal to be performed.

Here, the multi terminal 27 includes a universal serial bus (USB) port and an auxiliary (AUX) terminal, and may further include a secure digital (SD) slot, and may be electrically connected to an external device through a connector or a cable.

In this case, the external device may include a storage device, a user terminal, an MP3 player, and the like, and the storage device may include a card-type memory and an external hard disk. In addition, the user terminal may include a smart phone, a notebook, a tablet, and the like as a mobile communication terminal.

A center input device 43 of a jog shuttle type or a hard key type may be provided on a center console 40. The center console 40 refers to an area where a gear operating lever 41 and a tray 42 are disposed between a driver's seat 21 and a front passenger's seat 22. The center input device 43 may perform all or some of the functions of the input device 240 included in the AVN device 23.

The vehicle 1 according to an exemplary embodiment of the present disclosure may sense a voice command of the user through a voice sensor 220 and use the sensed voice command as a control basis.

The voice sensor 220 may include a microphone. When an utterance voice of the user is input, the voice sensor 220 converts the voice into an electrical signal and outputs the electrical signal to a voice recognition apparatus 100. In the following embodiments, a case where the voice sensor 220 is implemented as a microphone will be described as an example.

For effective voice recognition, the microphone may be mounted to a head lining 13 as shown in FIG. 2, but the embodiment of the present disclosure is not limited thereto. That is, it is also possible that the microphone is mounted on the dashboard 10 or mounted on a steering wheel 12. In addition, there is no restriction as long as the microphone is in a position suitable for receiving the user's voice.

Speakers 260 capable of outputting sound are provided inside the vehicle 1. Sound necessary for performing an audio function, video function, navigation function, and other additional functions such as voice recognition guidance may be output through the speakers 260.

FIG. 3 is a control block diagram of a vehicle according to an exemplary embodiment of the present disclosure.

Referring to FIG. 3, the vehicle 1 according to an exemplary embodiment of the present disclosure may include a communication device 210 capable of communicating with a user terminal, the voice sensor 220 for sensing voice uttered by the user, the voice recognition apparatus 100 for recognizing the sensed voice of the user, the input device 240 for receiving various inputs from the user, and a main controller 230 capable of controlling various configurations inside the vehicle 1.

First, the communication device 210 may receive various pieces of information from the user terminal through communication with the user terminal and transmit the information of the vehicle 1 to the user terminal.

The communication device 210 may perform wireless communication or wired communication with the user terminal. The communication device 210 may transmit and receive information between the user terminal and the main controller 230 and may also transmit and receive information between the user terminal and the voice recognition apparatus 100 when the recognition function is performed. In this case, the information to be transmitted and received may be a phonebook list, call history information, voice information, and operation command information, and the phonebook list may include at least one phonebook data piece in which a name and a phone number are matched.

As shown in FIG. 3, the communication device 210 may be connected directly to the main controller 230 of the vehicle 1 to transmit the information received from the user terminal through the main controller 230 to the voice recognition apparatus 100. The communication device 210 may also be connected directly to the voice recognition apparatus 100.

The communication device 210 is a hardware device and may include a wireless communication module that performs wireless communication, and further include one or more components. For example, in addition to the wireless communication module, the communication device 210 may further include at least one of a short-range communication module and a wired communication module.

The wireless communication module may include a wireless communication module supporting various wireless communication methods such as a Wi-Fi module, a wireless broadband module, a global system for mobile communication (GSM), a code division multiple access (CDMA), a wideband code division multiple access (WCDMA), a time division multiple access (TDMA), and long term evolution (LTE).

The short-range communication module may include various short-range communication modules that transmit and receive signals using a wireless communication network in a short distance such as a Bluetooth module, an infrared communication module, a radio frequency identification (RFID) communication module, a wireless local access network (WLAN) communication module, an NFC communication module, and a Zigbee communication module.

The wired communication module may not only include various wired communication modules such as a controller area network (CAN) communication module, a local area network (LAN) module, a wide area network (WAN) module, and a value added network (VAN), but may also include various cable communication modules such as a universal serial bus (USB), a high definition multimedia Interface (HDMI), and a digital visual interface (DVI).

In addition, the communication device 210 may be externally connected to the main controller 230 or embedded in the controller 230.

The voice sensor 220 may sense a voice uttered by the user and transmit the sensed voice signal to the main controller 230 or to the voice recognition apparatus 100.

The voice signal sensed by the voice sensor 220 may be utilized as a control basis for the voice recognition apparatus 100, which will be described later, to recognize a control command corresponding to the sensed voice signal and to generate a voice recognition result.

The voice sensor 220 may be activated when a voice recognition performance command is input by the input device 240 to sense the voice of the user. In addition, the voice sensor 220 may be activated when the start of the vehicle 1 is turned on to sense the voice of the user.

The input device 240 may receive a voice recognition performance command from the user and may also receive commands related to various devices in the vehicle 1. The description of the input device 240 is omitted since it has been described above.

The voice recognition apparatus 100 may collect the user's voice signals sensed by the voice sensor 220 and recognize the collected voice signals.

In this case, recognizing the voice signal may include a series of operations for determining an operation command corresponding to the collected voice signal and for identifying a device having the determined operation command.

The voice recognition apparatus 100 may generate a voice recognition result including the determined operation command and a device that is identified to have the operation command.

The voice recognition apparatus 100 may transmit the generated voice recognition result to the main controller 230 so that the main controller 230 transmits a control command to the identified device.

In addition, the voice recognition apparatus 100 may directly transmit the operation command to the identified device.

A detailed description of the voice recognition operation and the voice recognition result generation operation of the voice recognition apparatus 100 will be described later.

The main controller 230 may control various configurations inside the vehicle 1.

In particular, when a pairing command is inputted between the user terminal and the communication device 210, the main controller 230 may perform pairing with the user terminal and control the communication device 210 to perform communication with the user terminal.

The main controller 230 may also control the voice recognition apparatus 100 to activate the voice recognition apparatus 100 when a voice recognition function execution command is input.

In this case, the main controller 230 may transmit the user's voice signal sensed by the voice sensor 220 to the voice recognition apparatus 100, and receive the voice recognition result from the voice recognition apparatus 100 and provide a function corresponding to the voice recognition result.

The main controller 230 may receive an operation command and the information of a device that is confirmed to have the operation command as the voice recognition result. The confirmed device may be various configurations inside the vehicle 1 including an air conditioner, an audio device, a vehicle terminal, the speakers 260 and the display 21, or may be a user terminal.

If the confirmed device is a user terminal, the main controller 230 may control the communication device 210 to transmit a corresponding operation command to the user terminal.

Through this, the main controller 230 may provide a function corresponding to the voice uttered by the user.

On the other hand, in providing the function corresponding to the voice uttered by the user, since the pronunciation may be different for each user and the personal information of the user may be different, a difference in voice recognition performance may occur depending on the information stored for each user. This difference in voice recognition performance may lead to a difference in voice recognition accuracy and voice recognition speed, resulting in a difference in the user's sense of satisfaction.

A conventional voice recognition system applies a fixed parameter value based on an average value of a user's phonebook list and predetermined recognition performance information. In this case, if the number of stored phonebook data pieces is large and there are many names including words that are difficult to be recognized such as monosyllable names among the names designated in the phonebook data causing the recognition rate to be lowered, it is necessary to select the parameter value that can increase the recognition rate rather than the reaction rate. On the other hand, if the number of phonebook data pieces is small, it is necessary to select a parameter value that can increase the reaction rate rather than the recognition rate.

Therefore, it is important to set parameter values based on the personal information of the user which may differ from user to user, such as the phonebook list and call history information of the user.

Hereinafter, a specific operation of the voice recognition apparatus according to an exemplary embodiment of the present disclosure will be described with reference to FIG. 4, FIG. 5A and FIG. 5B.

Figure 4:
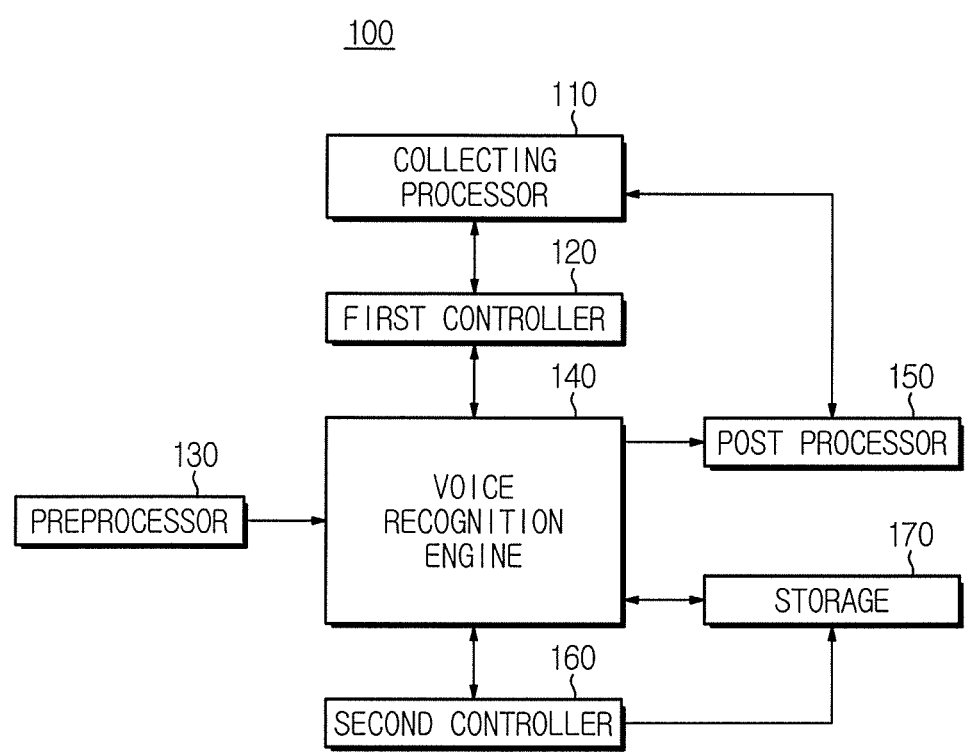
FIG. 4 is a control block diagram of a voice recognition apparatus according to an exemplary embodiment of the present disclosure.

FIG. 4 is a control block diagram of a voice recognition apparatus according to an exemplary embodiment of the present disclosure, and FIGS. 5A and 5B are tables for explaining a setting operation of a parameter value of a voice recognition apparatus according to an exemplary embodiment of the present disclosure.

Referring to FIG. 4, the voice recognition apparatus 100 according to an exemplary embodiment of the present disclosure may include an information collecting processor 110, a first controller 120, a preprocessor 130, a voice recognition engine 140, a post processor 150, a storage 170, and a second controller 160.

First, the information collecting processor 110 may acquire information received from the user terminal and information received from the communication device 210. At this time, the information received by the information collecting processor 110 includes a phonebook list including at least one phonebook data piece matched with a name and a phone number stored in the user terminal, call history information, sensed voice signal information, operation command information, and the like.

The information collecting processor 110 may receive information from the main controller 230 and may receive information from the communication device 210.

In particular, at least one of the phonebook list and the call history information of the user terminal collected by the information collecting processor 110 may be utilized as a control basis of the first controller 120 and the post processor 150, which will be described later. In some embodiments, the information collecting processor 110 and the voice recognition engine 140 may be embedded in the first controller 120. In addition, the information collecting processor 110 may be a processor that receives and collects user terminal data (phonebook information and call history information), and the voice recognition engine 140 may be a processor that recognizes and analyzes user's voice. The voice recognition engine 140 may perform speech recognition in the usual way. For example, the voice recognition engine 140 interprets the speech language that user speaks and converts the contents into character data.

The first controller 120 may determine whether to change the voice recognition parameter value of the voice recognition engine 140, which will be described later, from at least one of the phonebook list and the call history information collected by the information collecting processor 110, and change the voice recognition parameter value according to the determination result.

Specifically, the first controller 120 may extract information necessary for determining whether to change the voice recognition parameter value from the phonebook list collected by the information collecting processor 110. The first controller 120 may extract at least one of the number of total phonebook data pieces, the number of phonebook data pieces in which the designated names are one word, and the number of phonebook data pieces in which the designated names have similar pronunciations, from the phonebook list.

The first controller 120 may compare each of the extracted information pieces with a predetermined reference value, and determine whether to change the voice recognition parameter value according to the comparison result. In this case, the reference value may be an average value or a value stored in advance.

For example, the first controller 120 may increase the voice recognition accuracy parameter value when it is determined that the number of the total phonebook data pieces among the extracted information is larger than the predetermined reference value.

As another example, the first controller 120 may increase the voice recognition accuracy parameter value when it is determined that the number of phonebook data pieces in which the designated names are one word among the extracted information is larger than the predetermined reference value.

As another example, the first controller 120 may increase the voice recognition accuracy parameter value when it is determined that the number of phonebook data pieces in which the designated names have similar pronunciations is larger than the predetermined reference value.

Further, the first controller 120 may increase the parameter value when each of the extracted information pieces has a value higher than the predetermined reference value, and reduce the parameter value when each of the extracted information pieces has a value lower than the predetermined reference value.

In addition, when the extracted information has the same value as the reference value, the first controller 120 may not change the parameter value.

Further, the first controller 120 may determine the voice recognition difficulty from the phonebook list collected by the information collecting processor 110, and optimize the voice recognition parameters of the voice recognition engine 140, which will be described later.

Specifically, the first controller 120 may determine the voice recognition difficulty from the phonebook list, and change the voice recognition parameter value of the voice recognition engine 140 according to the determined voice recognition difficulty.

The first controller 120 may determine that the voice recognition difficulty is high when at least one of the case where it is determined that the number of the total phonebook data pieces is larger than the predetermined reference value, the case where it is determined that the number of phonebook data pieces in which the designated names are one word is larger than the predetermined reference value, and the case where it is determined that the number of phonebook data pieces in which the designated names have similar pronunciations is larger than the predetermined reference value is present.

When it is determined that the voice recognition difficulty is high, the first controller 120 may change the voice recognition parameter value of the voice recognition engine 140. Specifically, the first controller 120 may increase the accuracy parameter value of the voice recognition engine 140.

Through this, the first controller 120 may provide a more accurate voice recognition function to the user by setting the parameter value so as to increase the accuracy of recognition rather than the reaction rate when the voice recognition difficulty is high.

Further, the first controller 120 may determine that the voice recognition difficulty is low when at least one of the case where it is determined that the number of the total phonebook data pieces is smaller than the predetermined reference value, the case where it is determined that the number of phonebook data pieces in which the designated names are one word is smaller than the predetermined reference value, and the case where it is determined that the number of phonebook data pieces in which the designated names have similar pronunciations is smaller than the predetermined reference value is present.

When it is determined that the voice recognition difficulty is low, the first controller 120 may change the voice recognition parameter value of the voice recognition engine 140. Specifically, the first controller 120 may reduce the accuracy parameter value of the voice recognition engine 140.

In this case, the voice recognition difficulty is low, and it is possible to secure recognition performance even if the accuracy parameter value is reduced, so that the first controller 120 may further increase the satisfaction of the user by setting the parameter value so as to increase the reaction rate rather than the accuracy.

The various embodiments disclosed herein, including embodiments of the voice recognition apparatus 100 and/or elements thereof, can be implemented using one or more processors coupled to a memory (or other non-transitory machine readable recording medium) storing computer-executable instructions for causing the processor(s) to perform the functions described above including the functions described in relation to the information collecting processor 110, the first controller 120, the preprocessor 130, the voice recognition engine 140, the post processor 150, and the second controller 160.

In addition, the first and second controllers 120 and 160 may be electronic control units (ECUs).

FIG. 5A is a table for explaining a parameter setting operation of the first controller when the number of phonebook data pieces is larger than a reference value.

As shown in FIG. 5A, the reference value of a voice recognition system of the voice recognition apparatus 100 according to an exemplary embodiment of the present disclosure may have the following values, the number of phonebook data pieces: 1000, the recognition rate: 95%, the reaction time: 3.0 seconds, and the accuracy parameter: 1500.

When the number of the user's phonebook data pieces is 5000, and the reference value (1500) of the accuracy parameter and the reference value (3.0 seconds) of the reaction time are applied, the recognition rate becomes 80%. In this case, a low recognition rate may cause inconvenience to a user having a large number of phonebook data pieces.

The first controller 120 may determine that the recognition difficulty is high when the number (5000) of phonebook data pieces is larger than the reference value (1000). In this case, the first controller 120 may increase the accuracy parameter value by changing the accuracy parameter value from 1500 to 2500. As the accuracy parameter value increases, the recognition rate is changed from 80% (before change) to 90% (after change) so that it is possible to provide a more accurate voice recognition function.

In this case, the reaction time increases to 4.0 seconds by the increased accuracy parameter value. However, the improvement of the recognition rate rather than shortening of the reaction time may impart better satisfaction to a user who has a large number of phonebook data pieces.

Accordingly, the first controller 120 may provide a voice recognition function suitable for a user having a large number of phonebook data pieces through the operation of increasing the accuracy parameter value.

FIG. 5B is a table for explaining a parameter setting operation of the first controller when the number of phonebook data pieces is smaller than a reference value.

As shown in FIG. 5B, the reference value of a voice recognition system of the voice recognition apparatus 100 according to an exemplary embodiment of the present disclosure may have the following values, the number of phonebook data pieces: 1000, the recognition rate: 95%, the reaction time: 3.0 seconds, and the accuracy parameter: 1500.

In this case, when the number of the user's phonebook data pieces is 100, the user may be satisfied with a faster reaction rate rather than accurate recognition.

The first controller 120 may determine that the recognition difficulty is low when the number (100) of phonebook data pieces is smaller than the reference value (1000). In this case, the first controller 120 may reduce the accuracy parameter value by changing the accuracy parameter value from 1500 to 500. The reaction time is further reduced from 2.0 seconds (before change) to 1.0 seconds (after change) by the reduced accuracy parameter value, and thus it is possible to provide a faster voice recognition function.

In this case, as the accuracy parameter value reduces, the recognition rate is changed from 95% (before change) to 94% (after change), and thus, the accuracy is somewhat reduced. However, shortening of the reaction time rather than the improvement of the recognition rate may impart better satisfaction to a user who has a small number of phonebook data pieces.

Accordingly, the first controller 120 may provide a voice recognition function suitable for a user having a small number of phonebook data pieces through the operation of reducing the accuracy parameter value.

The preprocessor 130 may remove a noise signal from the voice signal sensed by the voice sensor 220 and extract a feature vector. The voice signal on which the preprocessing is performed may be a digital signal. The preprocessor 130 may perform analog-to-digital conversion, and the voice signal converted into a digital signal may be input to the preprocessor 130.

The preprocessor 130 may extract a feature from the voice signal from which the noise signal is removed, and the feature extracted at this time may be a vector form. For example, the preprocessor 130 may extract a feature vector by applying a feature vector extraction technique such as cepstrum, linear predictive coefficient (LPC), mel-frequency cepstral coefficient (MFCC), or filter bank energy, to the voice signal from which the noise signal has been removed.

However, the voice recognition apparatus 100 does not necessarily include the preprocessor 130 and may be omitted.

The voice recognition engine 140 may compare the voice signal sensed by the voice sensor 220 with reference pronunciation string data and match the sensed voice signal with a command word of the reference pronunciation string data according to the comparison result.

Specifically, the voice recognition engine 140 may calculate the similarity according to the matching result between the voice signal sensed by the voice sensor 220 and the reference pronunciation string data stored in the storage 170, and may list the command words of the reference pronunciation string data in the order of highest similarity.

At this time, the voice recognition engine 140 may match the command word having the highest degree of similarity to the voice signal among the command words of the reference pronunciation string data, that is, the highest priority command word among the listed command words, with the sensed voice signal. In this case, the listed command words may also be stored in the storage 170.

Alternatively, the voice recognition engine 140 may recognize the voice signal by comparing the feature vector extracted by the preprocessor 130 with a trained reference pattern. For example, an acoustic model that models and compares the signal characteristics of voice and a language model that models the linguistic order relation of a word or a syllable corresponding to a recognition vocabulary may be used. The reference pattern or model used for the comparison of the feature vectors may be stored in the storage 170.

The acoustic model may be divided into a direct comparison method of setting a recognition object as a feature vector model and comparing it with the feature vector of the voice data, and a statistical method of statistically processing and using a feature vector of a recognition object.

The direct comparison method is a method of setting a unit of the recognition target word and phoneme as the feature vector model and comparing the similarity of the input voice with the feature vector model, and typically, there is a vector quantization method. According to the vector quantization method, the feature vector of the input voice data is mapped to a codebook, which is a reference model, and is encoded into a representative value, thereby comparing the code values with each other.

The statistical model method is a method of constructing a unit of a recognition target as a state sequence and using the relationship between the state sequences. The status sequence may consist of a plurality of nodes. As the method of using the relationship between the state sequences, there are dynamic time warping (DTW), Hidden Markov Model (HMM), and a method of using a neural network.

The DTW is a method of compensating for differences in the time axis when compared to a reference model, taking into account the dynamic nature of the voice, where the length of the signal varies with time even if the same person pronounces the same word. The HMM is a recognition technique that estimates state transition probability and node observation probability through learning data and calculates the probability that the input voice will occur in the estimated model after assuming that voice is a Markov process having probability of state transition and observation probability of nodes (output symbols) in each state.

On the other hand, the language model modeling the linguistic order relations of words and syllables may reduce acoustic ambiguity and reduce recognition errors by applying the order relation between the units constituting the language to the units obtained by voice recognition. The language model includes a statistical language model and a model based on Finite State Automata (FSA), and in the statistical language model, chained probabilities of words such as unigram, bigram, and trigram are used.

The voice recognition engine 140 may use any of the above-described methods for recognizing the voice signal.

In this case, the operations in which the voice recognition engine 140 recognizes the voice signal may include a series of operations for determining the operation command corresponding to the voice signal collected by the information collecting processor 110 and identifying the device having the determined operation command.

The voice recognition engine 140 may generate voice recognition results that include the determined operation command and the device that have been found to have such operation command.

The voice recognition results generated by the voice recognition engine 140 may include command candidates whose similarity to the voice signal is within a predetermined range among the command words of the reference pronunciation string data. Such voice recognition results of the voice recognition engine 140 may include errors. Accordingly, the voice recognition apparatus 100 may further include the post processor 150, and the post processor 150 may detect an error included in the recognition result and correct the error by applying one of various post-processing algorithms.

Specifically, when the voice recognition engine 140 generates a voice recognition result, the post processor 150 may apply a post-processing weight value to the voice recognition result to correct the voice recognition result based on the call history information of the user collected by the information collecting processor 110.

The post processor 150 may correct the command words that are listed among the voice recognition results. Specifically, the post processor 150 may correct the order of the listed command words by applying a post-processing weight value to the similarity between the voice signal and the reference pronunciation string data, which is calculated by the voice recognition engine 140.

For example, the post processor 150 may calculate the call redial probability for each of phonebook data pieces included in the phonebook list using the collected call history information of the user, and apply a weight value based on the calculated call redial probability to the similarity between the voice signal and the reference pronunciation string data.

In this case, a weight value may be applied so that the command word for the phonebook data having a high probability of call redial among the command words of the reference pronunciation string data is more similar to the voice signal than the command word for the other phonebook data. In addition, according to the application of the weight value, the command word having the highest priority among the listed command words may be a command word for the phonebook data having a high probability of call redial.

As another example, the post processor 150 may apply a high post-processing weight value to the phonebook data having a high call history frequency according to the collected call history information of the user. In addition, the post processor 150 may apply a low post-processing weight value to the phonebook data having a low call history frequency among the collected call history information of the user.

As such, since the recognition result may be corrected by reflecting the call history information of the user, it is possible to perform a voice recognition function more suitable for each user, and the convenience of the user may be increased.

The second controller 160 may determine a behavior pattern of the user with respect to the voice recognition result generated by the voice recognition engine 140 and may update the pronunciation data stored in the storage 170 based on the determined behavior pattern of the user.

In this case, the behavior pattern of the user refers to control commands manually input by the user for performing a specific function.

Specifically, a voice recognition result including an operation command corresponding to a voice signal and a device that is identified to have the operation command is generated, and thus when the identified device performs the operation, the second controller 160 may confirm whether or not the performance of the operation according to the voice recognition result of the identified device is stopped.

If it is confirmed that the performance of the operation according to the voice recognition result of the identified device is stopped, the second controller 160 may determine the behavior pattern of the user by collecting the operation command according to the manual operation of the user and the device information that is identified to have the operation command.

That is, the second controller 160 may match the pronunciation string data recognized based on the voice uttered by the user and the pronunciation of the command word for the operation command directly selected by the user, and determine the behavior pattern of the user by collecting the matching result.

For example, in a case where the user utters 'Call Mary' but it is recognized as 'Harry', that is, in a case where the name of the phonebook data does not exactly match the name uttered by the user and the user does not have the desired voice recognition result, the user may manually operate the user terminal so that the phone function is performed after selecting the phonebook data designated as 'My Love Mary' in the phonebook list.

In this case, the second controller 160 may update the existing pronunciation string data stored in the storage 170 by adding 'My Love Mary' to the pronunciation string data for the phonebook data named 'Mary.'

Thereafter, when the user utters the message 'Call Mary,' the second controller 160 may transmit an operation command for transmitting a call to the phonebook data designated as 'My Love Mary' by using the updated existing pronunciation string data.

At this time, the second controller 160 may request the user for confirmation before transmitting the operation command according to the voice recognition result, and transmit an operation command to perform an operation when a confirmation command for the confirmation request is inputted from the user.

Through this, even when a name-matching error of the phonebook data occurs due to a difference between the stored name and the uttered content, the voice recognition result desired by the user may be expressed, and thus the user's convenience may be increased.

In addition, there may be a case where the pronunciation uttered by the user does not coincide with the standard pronunciation. That is, if one word may be pronounced variously, the voice recognition result may include errors. For example, in the case of a foreign language name, it may be variously pronounced.

The second controller 160 may determine the user's favorite pronunciation by matching the pronunciation of the voice uttered by the user with the pronunciation string data corresponding to the pronunciation. Through this, improvement of the recognition rate suitable for each user may be expected.

Further, the second controller 160 may determine whether to update the stored pronunciation string data based on whether the execution of the operation according to the generated voice recognition result is stopped. At this time, determining whether to update the pronunciation string data may include determining whether to determine a behavior pattern of the user.

When it is confirmed that the operation according to the generated voice recognition result is stopped, that is, when the user stops the operation according to the voice recognition result and inputs an operation command by the manual operation, the second controller 160 may determine to update the stored pronunciation string data.

In this case, the second controller 160 may determine whether to update the stored pronunciation string data based on the number of times that the user inputs the specific operation command after stopping the operation according to the generated voice recognition result.

For example, when a case where the execution of the operation according to the generated voice recognition result is stopped and the specific operation command is input according to the manual operation of the user is repeated three or more times, the second controller 160 may determine to update the stored pronunciation string data.

Through this, the second controller 160 may update only when it is necessary to update the pronunciation string data, and prevent the voice recognition performance from deteriorating due to updating of erroneous pronunciation string data.

Further, the second controller 160 may analyze the similarity between the voice recognition result and the operation performed manually by the user, and determine whether to update the stored pronunciation string data according to the analysis result.

Specifically, when the similarity between the voice recognition result and the operation manually performed by the user is equal to or greater than a predetermined value, the second controller 160 may determine to update the stored pronunciation string data.

When it is determined that the stored pronunciation string data is to be updated, the second controller 160 may determine a behavior pattern of the user based on an operation manually performed by the user.

As such, only when the user's intention may be confirmed, the update of the pronunciation string data and the determining of the behavior pattern of the user may be performed. Therefore, more accurate determining may be performed and an improvement in recognition performance may be expected.

Further, the second controller 160 may determine whether to update the pronunciation string data stored based on at least one of the number of utterances of the user, the stored phonebook list, and the call history information.

Specifically, when the number of utterances of the user for a specific word is less than a predetermined number of utterances, the second controller 160 may determine not to update the pronunciation string data for the corresponding word.

Further, the second controller 160 may determine not to update the pronunciation string data for the phonebook data having no call history based on the call history information.

Through this, since deterioration of voice recognition performance due to updating of erroneous pronunciation string data may be prevented, improvement in recognition performance may be expected.

On the other hand, at least one of the first controller 120, the preprocessor 130, the voice recognition engine 140, the post processor 150, and the second controller 160 may include a memory for storing various data such as programs and algorithms necessary for performing the respective operations, and a processor for executing the program stored in the memory to process the data.

Some or all of the first controller 120, the preprocessor 130, the voice recognition engine 140, the post processor 150, and the second controller 160 may share a processor or a memory.

That is, one processor may perform some or all of the functions of the first controller 120, the preprocessor 130, the voice recognition engine 140, the post processor 150 and the second controller 160, or one memory may store the data required by some or all of the functions of the first controller 120, the preprocessor 130, the voice recognition engine 140, the post processor 150 and the second controller 160.

As described above, the storage 170 may store reference pronunciation string data that may be utilized as a control basis of the voice recognition engine 140, and store the listed command words. The storage 170 may also store a reference pattern or a model used for comparison with the feature vector extracted by the preprocessor 130.

The storage 170 may include at least one of a nonvolatile memory such as a flash memory, a read only memory, an erasable programmable read only memory (EPROM), and an electrically erasable programmable read only memory (EEPROM), and further include at least one of a volatile memory such as a random access memory (RAM), a static random access memory (S-RAM), and a dynamic random access memory (D-RAM).

The first controller 120, the preprocessor 130, the voice recognition engine 140, the post processor 150, and the second controller 160 may share a memory with the storage 170 or may have a separate memory. It is also possible that they share a memory or a processor with other components of the vehicle 1 in addition to the components of the voice recognition apparatus 100.

In addition, the processor and the memory may be provided as a single configuration, a plurality of configurations, physically separated configurations, or a single chip according to their capacities.

FIG. 6 is a flow chart of a vehicle control method according to an exemplary embodiment of the present disclosure.

Referring to FIG. 6, the vehicle 1 according to an exemplary embodiment of the present disclosure may confirm whether the vehicle and the user terminal are communicatively connected (610).

If the communication is connected (YES in 610), the vehicle 1 may acquire a phonebook list from the user terminal (620). In this case, the phonebook list includes at least one phonebook data piece matched with a name and a phone number stored in the user terminal. The vehicle 1 may further acquire the call history information of the user terminal together with the phonebook list.

Thereafter, the vehicle 1 may extract information necessary for determining whether or not the voice recognition parameter value is changed from the phonebook list (630).

Specifically, the vehicle 1 may extract at least one of the number of the total phonebook data pieces, the number of phonebook data pieces in which the designated names are one word, and the number of phonebook data pieces in which the designated names have similar pronunciations, from the phonebook list received from the user terminal.

When the necessary information is extracted, the vehicle 1 may determine whether a voice recognition parameter change is necessary (640).

Specifically, the vehicle 1 may compare each of extracted information pieces with a predetermined reference value, and determine whether to change the voice recognition parameter value according to the comparison result. In this case, the reference value may be an average value or a value stored in advance.

The vehicle 1 may determine to change the voice recognition parameter value when the extracted information has a value different from the predetermined reference value, and determine not to change the parameter value when the extracted information has the same value as the determined reference value.

The step (640) of determining whether the change of the voice recognition parameter value of the vehicle 1 is necessary may include a step of determining the voice recognition difficulty.

The vehicle 1 may determine that the voice recognition difficulty is high when the extracted information has a value larger than the predetermined reference value and may determine that the voice recognition difficulty is low when the extracted information has a value smaller than the predetermined reference value.

When it is determined that a change in the voice recognition parameter value is required (YES in 640), the vehicle 1 may change the voice recognition parameter value (650).

For example, the voice recognition parameter may be an accuracy parameter. At this time, if the vehicle 1 determines that the number of the total phonebook data pieces among the extracted information is larger than the predetermined reference value, it may be determined that the voice recognition difficulty is high, and the voice recognition accuracy parameter value may be increased.

As another example, if the vehicle 1 determines that the number of phonebook data pieces in which the designated names are one word is smaller than the predetermined reference value, it may be determined that the voice recognition difficulty is low and the voice recognition accuracy parameter value may be decreased.

Through this, the vehicle 1 may change the voice recognition parameter value to suit the user, and the user's convenience and satisfaction may be increased.

FIG. 7 is a flow chart of a vehicle control method according to an exemplary embodiment of the present disclosure.

Referring to FIG. 7, the vehicle 1 according to an exemplary embodiment of the present disclosure may confirm whether a voice recognition command is input (710). At this time, the vehicle 1 may confirm whether or not a voice recognition command is inputted from the user through the input device 240.

If it is confirmed that there is a voice recognition command (YES in 710), the vehicle 1 may determine whether a voice signal that the user uttered is sensed (720).

When the voice signal uttered by the user is sensed (YES in 720), the vehicle 1 may recognize the voice signal (730).

Specifically, the vehicle 1 may recognize the voice signal by determining an operation command corresponding to the sensed voice signal and confirming a device having the determined operation command. In the process of determining the operation command corresponding to the sensed voice signal, the vehicle 1 may compare the sensed voice signal with the reference pronunciation string data stored in advance, and match the sensed voice signal with the command word of the reference pronunciation string data according to the comparison result.

The vehicle 1 may calculate the similarity according to the matching result between the sensed voice signal and the reference pronunciation string data, and list the command words of the reference pronunciation string data in the order of the highest degree of similarity and determine the command word in the highest priority as an operation command corresponding to the sensed voice signal.

Thereafter, the vehicle 1 may generate a voice recognition result (740), and the generated voice recognition result may include an operation command determined in the previous step (730) and a device that has been confirmed to have such an operation command.

After the voice recognition result is generated, the vehicle 1 may apply a post-processing weight value to the voice recognition result (750). Specifically, the vehicle 1 may apply the post-processing weight value to the voice recognition result based on the call history information.

Specifically, the vehicle 1 may calculate the degree of similarity between the voice signal and the reference pronunciation string data, and correct the order of the listed command words included in the generated voice recognition result by applying the post-processing weight value to the similarity.

For example, the vehicle 1 may calculate a call redial probability for each of phonebook data pieces included in the phonebook list using the collected call history information of the user, and apply a weight value based on the calculated call redial probability to the similarity between the voice signal and the reference pronunciation string data. In this case, a weight value may be applied so that the command word for the phonebook data having a high probability of call redial is more similar to the voice signal than the command word for other phonebook data among the command words of the reference pronunciation string data.

The vehicle 1 may correct the voice recognition result generated by applying the post-processing weight value (760) and transmit the corrected voice recognition result (770). In this case, the vehicle 1 may control the operation to be performed according to the corrected voice recognition result by transmitting the corrected voice recognition result to the user terminal.

As such, since it is possible to improve the voice recognition performance based on the specific personal information of the user such as the phonebook list and call history information of the user, the accuracy of the voice recognition and the convenience of the user may be increased.

Figure 8:
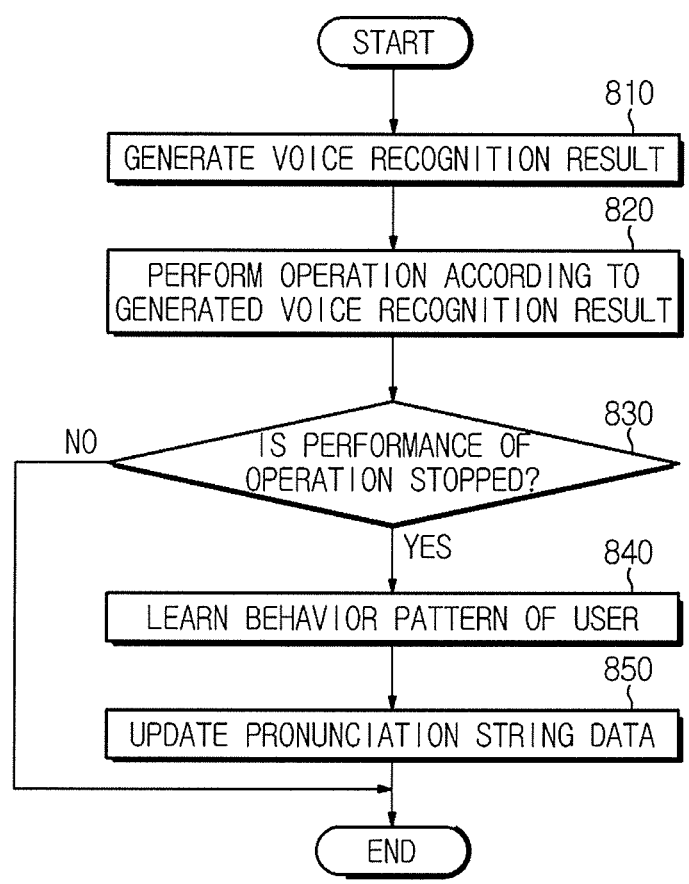
FIG. 8 is a flow chart of a vehicle control method according to an exemplary embodiment of the present disclosure.

FIG. 8 is a flow chart of a vehicle control method according to an exemplary embodiment of the present disclosure.

Referring to FIG. 8, the vehicle 1 according to an exemplary embodiment of the present disclosure may generate a voice recognition result (810) and perform an operation according to the generated voice recognition result (820). The detailed description thereof is the same as the above-mentioned description and thus will be omitted.

Thereafter, the vehicle 1 may confirm whether the operation according to the voice recognition result is stopped (830).

When the operation performance is stopped (YES in 830), the vehicle 1 may determine a behavior pattern of the user (840). At this time, the behavior pattern of the user refers to control commands manually input by the user for performing a specific function.

Specifically, the vehicle 1 may determine a behavior pattern of the user by collecting an operation command according to a manual operation of the user and device information confirmed to have such an operation command.

That is, the vehicle 1 may match the pronunciation string data recognized according to the voice uttered by the user and the pronunciation of the command word for the operation command directly selected by the user, and determine the behavior pattern of the user by collecting the matching result.

At this time, the operation of determining the behavior pattern of the user may include an operation of determining the user's favorite pronunciation by matching the pronunciation of the voice uttered by the user and the pronunciation string data corresponding to the voice.

Thereafter, the vehicle 1 may update the stored pronunciation string data utilizing the determined behavior pattern of the user (850). At this time, the vehicle 1 may update the pronunciation string data by correcting the stored pronunciation string data or adding new pronunciation to the existing pronunciation string data.

As such, when the voice recognition result is erroneous, since the user behavior pattern may be determined, resultantly the improvement of the recognition rate suitable for each user may be expected. In addition, convenience and satisfaction of the user may be increased.

As is apparent from the above, according to the voice recognition apparatus according to an embodiment of the present disclosure, the vehicle including the same, and the control method thereof, it is possible to provide the voice recognition function optimized for the user, thereby enhancing convenience and satisfaction of the user.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A voice recognition apparatus comprising a first controller configured to:
   acquire a voice signal of a user and acquire a phonebook list including at least one phonebook data piece in which a name and a phone number match from a user terminal;
   recognize the voice signal based on a voice recognition parameter; and
   determine whether to change a value of the voice recognition parameter based on the phonebook list and change the value of the voice recognition parameter based on the determination result,
   wherein the first controller extracts at least one information of a number of total phonebook data pieces, a number of phonebook data pieces in which names are one word, or a number of phonebook data pieces in which names have similar pronunciations from the phonebook list, and determines whether to change the value of the voice recognition parameter based on the extracted at least one information.

2. The voice recognition apparatus according to claim 1, wherein the first controller further acquires call history information from the user terminal.

3. The voice recognition apparatus according to claim 2, further comprising a post processor configured to apply a post-processing weight value to a voice recognition result of the first controller based on the call history information and to correct the voice recognition result.

4. The voice recognition apparatus according to claim 1, wherein the voice recognition parameter is an accuracy parameter, and
   wherein the first controller determines the voice recognition difficulty based on the extracted information and determines whether to change a value of the accuracy parameter based on the determined voice recognition difficulty.

5. The voice recognition apparatus according to claim 4, wherein the first controller increases the value of the accuracy parameter when it is determined that the voice recognition difficulty is high.

6. The voice recognition apparatus according to claim 5, wherein the first controller determines that the voice recognition difficulty is high when at least one of the case where the number of total phonebook data pieces is larger than a predetermined number, the case where the number of phonebook data pieces in which names are one word is larger than a predetermined number, and the case where the number of phonebook data pieces in which names have similar pronunciations is larger than a predetermined number is present.

7. The voice recognition apparatus according to claim 4, wherein the first controller decreases the value of the accuracy parameter when it is determined that the voice recognition difficulty is low.

8. The voice recognition apparatus according to claim 1, further comprising:
   a storage storing pronunciation string data; and
   a second controller configured to confirm whether the performance of the operation according to a voice recognition result of the first controller stops, and to update the pronunciation string data based on the confirmation result,
   wherein the first controller recognizes the voice signal by matching the voice signal and the pronunciation string data.

9. The voice recognition apparatus according to claim 8, wherein the second controller determines a behavior pattern of the user when the performance of the operation according to the voice recognition result stops, and updates the pronunciation string data by reflecting the determined behavior pattern.

10. The voice recognition apparatus according to claim 8, wherein the second controller determines whether to update the pronunciation string data based on at least one of a number of utterances of the user, the phonebook list, or call history information.

11. A vehicle comprising:
    a communication device configured to receive a phonebook list including at least one phonebook data piece in which a name and a phone number are matched from a user terminal;
    a voice sensor configured to sense a voice uttered by a user and convert the voice into a voice signal;
    a voice recognition apparatus configured to: acquire the phone hook list of the user terminal received by the communication device; change a value of a voice recognition parameter based on the phonebook list; and recognize the voice signal based on the voice recognition parameter; and a main controller configured to transmit an operation command according to a voice recognition result of the voice recognition apparatus to the communication device, wherein the voice recognition apparatus extracts at least one information of a number of total phonebook data pieces a number of phonebook data pieces in which names are one word or a number of phonebook data pieces in which names have similar pronunciations from the phonebook list, determines whether to change the value of the voice recognition parameter based on the extracted at least one information, and changes the value of the voice recognition parameter according to the determination result.

12. The vehicle according to claim 11, wherein the voice recognition parameter is an accuracy parameter, and wherein the voice recognition apparatus determines the voice recognition difficulty based on the extracted information and determines whether to change the value of the accuracy parameter based on the determined voice recognition difficulty.

13. The vehicle according to claim 12, wherein the voice recognition apparatus increases the value of the accuracy parameter when it is determined that the voice recognition difficulty has a higher value than a reference value, and decreases the value of the accuracy parameter when it is determined that the voice recognition difficulty has a lower value than the reference value.

14. A control method of a vehicle comprising steps of:
confirming, by a controller, whether a vehicle and a user terminal are communicatively connected;
acquiring, by the controller, a phonebook list including at least one phonebook data piece in which a name and a phone number are matched from the user terminal;
changing, by the controller, a value of a voice recognition parameter based on the phonebook list;
sensing, by the controller, a voice uttered by a user and converting the voice into a voice signal;
recognizing, by the controller, the voice signal based on the voice recognition parameter to generate a voice recognition result;
transmitting, by the controller, an operation command according to the voice recognition result;
acquiring, by the controller; call history information from the user terminal; and
applying, by a post processor, a post-processing weight value to a voice recognition result based on the call history information and correcting the voice recognition result,
wherein the step of changing a value of a voice recognition parameter comprises:
extracting at least one information of a number of total phonebook data pieces, a number of phonebook data pieces in which names are one word, or a number of phonebook data pieces in which names have similar pronunciations from the phonebook list,
determining whether to change the value of the voice recognition parameter based on the extracted information, and
changing the value of the voice recognition parameter according to a determination result.

15. The control method of a vehicle according to claim 14, wherein the voice recognition parameter is an accuracy parameter, wherein the step of changing a value of a voice recognition parameter based on the phonebook list comprises:
determining the voice recognition difficulty based on the extracted information, and
changing the value of the accuracy parameter based on the determined voice recognition difficulty, and wherein the step of changing the value of the accuracy parameter based on the determined voice recognition difficulty increases the value of the accuracy parameter when it is determined that the voice recognition difficulty is high, and decreases the value of the accuracy parameter when it is determined that the voice recognition difficulty is low.

16. The control method of a vehicle according to claim 15, wherein the step of determining the voice recognition difficulty based on the extracted information determines that the voice recognition difficulty is high when at least one of the case where the number of total phonebook data pieces is larger than a predetermined number, the case where the number of phonebook data pieces in which names are one word is larger than a predetermined number, or the case where the number of phonebook data pieces in which names have similar pronunciations is larger than a predetermined number is present.

17. The control method of a vehicle according to claim 14, further comprising:
generating a voice recognition result by matching pronunciation sting data stored in advance with the voice signal;
confirming whether the performance of the operation according to the voice recognition result stops; and
updating the pronunciation string data based on the confirmation result,
wherein the step of updating the pronunciation string data based on the confirmation determines a behavior pattern of the user when the performance of the operation according to the voice recognition result stops, and updates the pronunciation string data by reflecting the determined behavior pattern.

* * * * *